Dec. 27, 1927.
W. C. McKEOWN
1,653,811
AUTOMATIC REDUCING AND CUT-OFF VALVE
Filed June 20, 1925
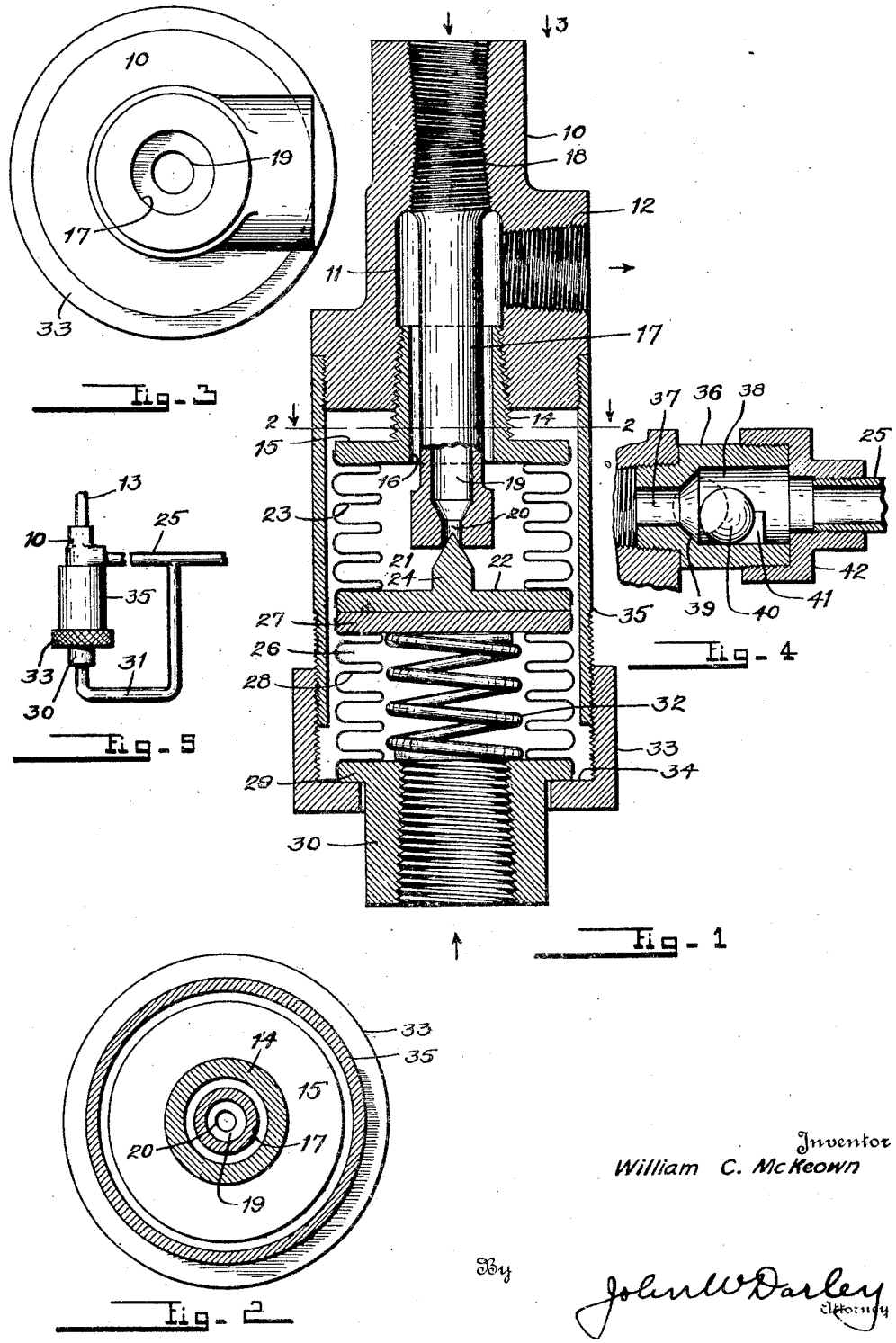
Inventor
William C. McKeown
By John W Darley
Attorney Patented Dec. 27, 1927.

1,653,811

UNITED STATES PATENT OFFICE.

WILLIAM C. McKEOWN, OF BALTIMORE, MARYLAND, ASSIGNOR TO MODERN HOUSEHOLD APPLIANCE COMPANY, OF BALTIMORE, MARYLAND, A CORPORATION OF MARYLAND.

AUTOMATIC REDUCING AND CUT-OFF VALVE.

Application filed June 20, 1925. Serial No. 38,482.

My invention relates to automatic reducing and cut-off valves.

One object of my invention is to provide a valve for use in a fluid pressure line which is so constructed and arranged that the fluid passing therethrough may be initially throttled to effect any desired reduction in pressure, or extent of flow, dependent upon a predetermined maximum demand on the exhaust side of said valve, the variation in pressure or volume of flow thereafter being automatically controlled by the demand on said exhaust side, as the same varies from a maximum to zero.

A further object is to provide a valve of the character described which is marked by an absence of packed joints and a freedom of action of all moving parts, with a consequent prevention of leakage and sticking.

A further object is to provide a valve of the character described which is sensitive to small changes in pressure and in which the total movement of the regulating portion thereof is effected by the addition of relatively short movements of certain elements, whereby said valve is actuated with a minimum of wear on the working parts.

A further object is to provide a valve of the character described which is operable by means positioned out of the main line of flow of the fluid passing therethrough and which is provided with auxiliary means for preventing an inadvertent opening of the main valve contrary to the demand on the exhaust side thereof.

My improved valve is adapted more particularly for use with fluids which exist in a liquid state on the inlet side of the valve and, through a reduction in pressure in said valve, emerge therefrom in a vapor or gaseous condition. Such a use is exemplified in my copending application for a liquid fuel gas range, executed and filed on even date herewith. However, I do not desire to be limited to a use of the foregoing character, as it is obvious that my improved valve may be used advantageously with either liquids or gases, regardless of whether a transformation from one to the other occurs within the valve.

These and further objects will be set forth in the following specification, reference being had to the accompanying drawing, and the novel means by which said objects are effectuated will be definitely pointed out in the claims.

In the drawing:

Fig. 1 is a sectional elevation of my improved valve.

Fig. 2 is a section along the line 2—2 in Fig. 1 looking in the direction of the arrows.

Fig. 3 is a plan view of Fig. 1 looking in the direction of the arrow 3 in said figure.

Fig. 4 is an auxiliary valve, shown in sectional elevation, which is used with my improved valve under certain conditions of service.

Fig. 5 is a diagrammatic view showing the manner of connecting my improved valve in a fluid pressure line.

In the drawing:

The numeral 10 represents a body portion having a passage 11 and a passage 12 disposed substantially at right angles to the passage 11 and connecting said passage with one side of the body portion 10.

The upper portion of the passage 11 may be tapped for the reception of an inlet line 13 and the lower portion thereof may be tapped for the reception of a plug 14 having a flange 15. Said plug is provided with a passage 16 through which extends a stem 17, the upper end of which is screwed in a threaded portion 18 provided in the body 10 adjacent the terminus of the inlet line 13. The external diameter of said stem is smaller than the internal diameter of the passages 11 and 16, respectively. A duct 19 extends the full length of the stem 17 and near the lower portion thereof is contracted into an orifice 20. The mouth of said orifice is disposed below the flange 15 and within an extensible chamber 21, one end of which is formed by a disk 22 and the lateral surface of which by the superimposed folds 23 whose ends are secured respectively to the disk 22 and the flange 15. Said folds are preferably made from any suitable thin and flexible material which is impervious to liquids and gases and so that the disk 22 may be made to approach the flange 15, or recede therefrom, without setting up any destructive crystalline action in the curved portions of said folds.

The disk 22 is provided with a valve plug 24 which registers with the orifice 20 normally closing the same and hence a reciprocating movement of said disk, produced as hereinafter described, governs the extent of flow of the fluid through said orifice. It will also be understood that the interior of the chamber 21 is connected through the passages 16 and 11 with the passage 12, in which one end of an exhaust line 25 is secured, and that, therefore, a fluid entering my improved valve through the inlet line 13 eventually reaches the exhaust line 25 through the stem 17, chamber 21, and the passages 16 and 11, being reduced in pressure, or extent of flow, depending upon the character of the fluid, by the interaction of the orifice 20 and the valve plug 24.

In order to automatically control the movement of the plug 24, I employ a second extensible chamber 26 which is closed at its upper end by a disk 27, said disk abutting on the disk 22. The lateral surface of the chamber 26 is composed of folds 28 which are similar in construction to and formed from material similar to the folds 23. The upper end of said folds is secured to the disk 27 and the lower end to a flange 29 formed on a nipple 30. Said nipple is tapped for the reception of one end of a bypass 31, the other end of which is secured at any desired point of the exhaust line 25. The interior of the chamber 26 is therefore connected to said line. A coil spring 32 is disposed in the chamber 26 between the disk 27 and the flange 29 and serves to maintain said disk in contact with the disk 22, thereby normally retaining the plug 24 in closing engagement with the orifice 20. In order to provide any desired tension in said spring, a hollow nut 33, upon the interior shoulder 34 of which the flange 29 rests, is threaded upon one end of a sleeve 35, the other end of which is threaded on the body 10. Said sleeve encloses the chambers 21 and 26, but the latter are spaced from the inside thereof. From the foregoing, it will be noted that the body 10, the sleeve 35, the nut 33 and the nipple 30 comprise the casing of my improved valve.

The operation of my improved valve is as follows:

The valve having been inserted in a fluid line, as shown in Fig. 5, the nut 33 will be adjusted to permit a maximum movement of the plug 24 under operating conditions, dependent upon the pressure obtaining in the inlet line 13 and the maximum demand in the exhaust line 25. Pressure is then established in the line 13 and said pressure, operating upon the end of the plug 24, moves said plug and the attendant disk 22 downward against the pressure exerted by the spring 32. For the sake of clearness, it will be understood that a maximum demand exists in the exhaust line 25.

When the disk 22 reaches a position of equilibrium, the total pressure on the upper side thereof is composed of the inlet pressure which operates over a projected area of the upper portion of the plug 24 and also of a pressure operating on the upper surface of said disk. Said last named pressure will be lower than that obtaining in the line 13, due to the throttling action of the plug 24 and said pressure will also exist in the line 25 and, through the bypass 31, on the underside of the disk 27.

If now the demand in the exhaust line 25 falls below a maximum, the supply of fluid which had been established to meet this maximum exceeds the new requirement and, therefore, the pressure in the exhaust line 25 rises. This rise in pressure operates through the bypass 31 and causes an upward movement of the disk 27 until the metering plug 24 closes a sufficient amount of the orifice 20 to establish a new condition of equilibrium, at which time the flow through said orifice will be suitable for the demand in the exhaust line 25. From the foregoing, it will be obvious that fluctuation in the demand in the line 25 will cause corresponding movements of the plug 24 in order to obtain a supply of fluid to meet the changing requirements, and that when the demand in said line ceases, the pressure will rise sufficiently high to cause said plug to entirely close the orifice 20.

It will also be understood that, while the pressure fluid per square inch operating on the upper surface of the disk 22 is the same as that operating upon the under surface of the disk 27, since the interiors of the chambers 21 and 26 are both connected to the exhaust line 25, yet the total forces exerted at any instant on said disks by said pressure are not equal, due to the smaller area of the upper surface of the disk 22. The parts, including the plug 24 and spring 32, are so proportioned, however, as to obtain varying conditions of equilibrium as just described, depending upon the pressure existing in the line 25.

Under certain conditions of service, the line 25 may be so arranged that instantaneous pressures therein may tend to cause an increased flow through the orifice 20 at a time when a contrary condition is required. Such a condition is exemplified in my copending application for a gas range hereinbefore indicated. To prevent this contingency and to insure that the exhaust pressures will operate through the bypass 31, I mount a nipple 36 in the passage 12 having the ducts 37 and 38 of different diameters. The adjacent ends of said ducts form the valve seat 39 which is adapted for the reception of a ball 40 that normally rests on the bottom of the duct 38 against a stop 41. A coupling 42 is secured to the outer end of the nipple 36 and the exhaust line 25 is mounted in said coupling. As long as the pressure in the chambers 21 and 26, and the line 25 is the same, the ball remains in the full line position shown in Fig. 4, but if said pressure rises and the line 25 is so arranged that the easiest path therefor is toward the chamber 21 rather than the chamber 26, said ball will be moved into the dotted position shown in said figure and so insure the actuation of the plug 24 in accordance with the new demand in said line. This ball check valve is intended to be representative of any type of valve for accomplishing the same purpose.

It will be noted that my improved valve is characterized by an entire absence of packed joints or glands which renders it particularly advantageous for use in connection with liquids and gases having penetrating properties. No valve stems are required and as the moving parts are spaced from the enclosing casing, all sticking tendencies are obviated and said parts are therefore responsive to small changes in pressure, a factor which increases its accuracy as a throttling agent.

While I have shown one set of elements and combinations thereof for effecting one preferred form of my invention, it is to be understood that I do not desire to be limited to the exact forms and structures shown, for many changes may be made therein without departing from the spirit of my invention.

I claim:

1. A valve comprising a casing provided with an inlet port, an exhaust port, an auxiliary port adapted to be connected to the fluid line on the exhaust side of said valve, an orifice communicating with said inlet and exhaust ports, a chamber, communicating with said orifice, closed at one end and open to said exhaust port at the opposite end, the closed end of said chamber having a valve plug registering with said orifice and the lateral surface of said chamber being formed of a plurality of extensible folds, a second chamber similar to said first named chamber having the closed end thereof abutting the closed end of said first named chamber and the opposite end thereof open to said auxiliary port, and a spring interposed between the closed end of said second named chamber and the adjacent end of said casing whereby the pressure in said line by varying the lengths of said chambers determines the extent of flow through said orifice.

2. A valve comprising a casing provided with an inlet port, an exhaust port, an auxiliary port adapted to be connected to the fluid line on the exhaust side of said valve, an orifice communicating with said inlet and exhaust ports, a pair of abutting extensible chambers positioned in said casing, one of said chambers communicating with said exhaust port and having a valve plug registering with said orifice and the other of said chambers communicating with said auxiliary port, whereby variations in the pressure in said line, operating through said auxiliary port changes the lengths of said chambers and governs the extent of flow through said orifice.

3. A valve comprising a casing provided with an inlet port, an exhaust port, an auxiliary port adapted to be connected to the fluid line on the exhaust side of said valve, an orifice communicating with said inlet and exhaust ports, a pair of abutting extensible chambers positioned in said casing and spaced therefrom, one of said chambers communicating with said exhaust port and having a valve plug registering with said orifice and the other of said chambers communicating with said auxiliary port, whereby variations in the pressure in said line, operating through said auxiliary port changes the lengths of said chambers and governs the extent of flow through said orifice.

4. A valve comprising a casing provided with an inlet port, an exhaust port, an auxiliary port adapted to be connected to the fluid line on the exhaust side of said valve, an orifice communicating with said inlet and exhaust ports, a pair of abutting extensible chambers positioned in said casing, one of said chambers communicating with said exhaust port and having a valve plug registering with said orifice and the other of said chambers communicating with said auxiliary port, and means positioned adjacent said exhaust port for preventing an inadvertent admission of a pressure higher than that obtaining in the chamber opening to said exhaust port.

5. A valve comprising a casing provided with an inlet port, an exhaust port, an auxiliary port adapted to be connected to the fluid line on the exhaust side of said valve, an orifice communicating with said inlet and exhaust ports, a pair of abutting extensible chambers positioned in said casing, one of said chambers communicating with said exhaust port and having a valve plug registering with said orifice and the other of said chambers communicating with said auxiliary port, and a check valve positioned adjacent said exhaust port for preventing an inadvertent admission of a pressure higher than that obtaining in the chamber opening to said exhaust port.

6. A valve comprising a casing provided with an inlet port, an exhaust port, an auxiliary port adapted to be connected to the fluid line on the exhaust side of said valve, an orifice communicating with said inlet and exhaust ports, a pair of abutting extensible chambers positioned in said casing, one of said chambers being open to said exhaust port and having a valve plug registering with said orifice and the other of said chambers being open to said auxiliary port, and means for adjusting the lengths of said chambers to obtain a predetermined maximum flow through said orifice.

7. A valve comprising a casing provided with an inlet port, an exhaust port, an auxiliary port adapted to be connected to the fluid line on the exhaust side of said valve, an orifice communicating with said inlet and exhaust ports, a pair of abutting extensible chambers positioned in said casing, one of said chambers being open to said exhaust port and having a valve plug registering with said orifice and the other of said chambers being open to said auxiliary port, and manually operated means for adjusting the lengths of said chambers to obtain a predetermined maximum flow through said orifice.

8. A valve comprising a casing provided with an inlet port, an exhaust port, means provided with an orifice connected to said inlet port, a chamber, communicating with said orifice, closed at one end and open to said exhaust port at the opposite end, the closed end of said chamber having a valve plug normally closing said orifice and the lateral surface of said chamber being formed of a plurality of extensible folds, said plug being actuated by the pressure existing in said inlet port, and means for adjusting said plug for a predetermined maximum movement.

9. A valve comprising a casing provided with an inlet port, an exhaust port, an auxiliary port adapted to be connected to the fluid line on the exhaust side of said valve, an orifice communicating with said inlet and exhaust ports, an extensible chamber having a valve plug registering with said orifice and connected to said exhaust port, and adjustable means actuated by the pressure in said line through said auxiliary port for varying the flow through said orifice by changing the length of said chamber.

10. A valve comprising a casing provided with an inlet port, an exhaust port, an auxiliary port adapted to be connected to the fluid line on the exhaust side of said valve, an orifice communicating with said inlet and exhaust ports, a chamber, communicating with said orifice, closed at one end and open to said exhaust port at the opposite end, the closed end of said chamber having a valve plug registering with said orifice and the lateral surface of said chamber being formed of a plurality of extensible folds, a second chamber similar to said first named chamber having the closed end thereof abutting the closed end of said first named chamber and the opposite end thereof open to said auxiliary port, and a spring adjustably interposed between the closed end of said second named chamber and the adjacent end of said casing whereby the pressure in said line by varying the lengths of said chambers determines the extent of flow through said orifice.

11. A valve comprising a casing provided with an inlet port, an exhaust port, means provided with an orifice connected to said inlet port, an extensible chamber connected to said exhaust port and having a valve plug registering with said orifice, and adjustable yielding means adapted to normally maintain said metering means in closed relation to said orifice, said plug being actuated to open said orifice a predetermined amount by the pressure existing in said inlet port and to close said orifice by said yielding means.

In testimony whereof, I affix my signature.

WILLIAM C. McKEOWN.